US012341375B2

(12) United States Patent
Ghadami et al.

(10) Patent No.: US 12,341,375 B2
(45) Date of Patent: Jun. 24, 2025

(54) METHODS AND SYSTEMS FOR MANAGING STATE OF CHARGE OF AN ENERGY STORAGE SYSTEM DURING OFF-GRID OPERATION

(71) Applicant: Unirac, Inc., Albuquerque, NM (US)

(72) Inventors: Rasoul Ghadami, Diamond Bar, CA (US); Sandeep Narla, Newark, CA (US); Daidipya Patwa, San Francisco, CA (US); Udo Uebel, San Francisco, CA (US); Joseph Griffin, Austin, TX (US)

(73) Assignee: UNIRAC, INC., Albuquerque, NM (US)

( * ) Notice: Subject to any disclaimer, the term of this patent is extended or adjusted under 35 U.S.C. 154(b) by 638 days.

(21) Appl. No.: 17/587,448

(22) Filed: Jan. 28, 2022

(65) Prior Publication Data

US 2022/0247203 A1 Aug. 4, 2022

Related U.S. Application Data

(60) Provisional application No. 63/144,224, filed on Feb. 1, 2021.

(51) Int. Cl.
*H02J 7/00* (2006.01)
*H02J 7/35* (2006.01)

(52) U.S. Cl.
CPC .............. *H02J 7/35* (2013.01); *H02J 7/0048* (2020.01); *H02J 2300/24* (2020.01)

(58) Field of Classification Search
None
See application file for complete search history.

(56) References Cited

U.S. PATENT DOCUMENTS

2013/0162220 A1* 6/2013 Iijima .................... H02J 50/60
320/137
2022/0006294 A1* 1/2022 Nasuno ................ G07F 15/008

* cited by examiner

*Primary Examiner* — Arun C Williams
(74) *Attorney, Agent, or Firm* — Knobbe, Martens, Olson & Bear LLP

(57) ABSTRACT

The present disclosure provides a system and method for managing the state of charge of an energy storage system that is used as a backup power supply source in an electrical system. The energy storage system can operate in a selected mode of operation that includes a normal mode, a hibernation mode, and a suspension mode. A controller of the energy control system can determine the selected mode of operation for the energy storage system based on the current time of the day and electronic data related to a backup PV power generation system, the energy storage system, and a plurality of loads.

20 Claims, 8 Drawing Sheets

| Time | Typical Value | Description |
|---|---|---|
| $t_{wkup}$ | 9 AM | Predicted Time When PV Average Production Surpass Load Consumption Based on Historical Data Profile. The PV Production Profile will be Calculated Based on Average of Production During the Last 7 Days at the Same Time. The Consumption Profile will be Calculated Based on Minimum of Average Load Over the Last 7 Days at the Same Time (Base Load) |
| Attempt #1 (A1) | 9 AM | The First Attempt Time when We Bring Micro-grid up to Supply Load and Charge Battery: The Same $t_{wkup}$ |
| Attempt #2 (A2) | 10 AM | The Second Attempt Time: One Hour After A1 |
| Attempt #3 (A3) | 11 AM | The Third Attempt Time: Two Hours After A1 |
| Attempt #4 (A4) | 1 PM | The Fourth Attempt Time: Predicated Time of Maximum PV Production Based on Historical Data |
| Attempt #5 (A5) | 3 PM | The Fifth Attempt Time: Halfway Between A4 and $t_{suspend}$ |
| $t_{suspend}$ | 6 PM | Predicated Time When Consumption Surpass PV Production Based on Historical Data Profile. Production and Consumption Profile will be Identical to the One Used for $t_{wkup}$ Calculation |

FIG. 6

| SoC Levels | Example Value | Description |
|---|---|---|
| SoC Cutoff | 5% | Cut-off SoC: Threshold for Dropping Microgrid (e.g., ESS and Backup PV) Indefinitely |
| SoC dt_susp | 7% | Day-Time Suspend SoC: Threshold to Suspend ESS During Day-time and Wake up the Battery at Next A4 (Time of Next Predicted Maximum PV Production). Note the Wakeup Time can be on the Next Day. |
| SOC hiber | 10% | Day-time Hibernate SoC: Threshold to Hibernate ESS Without any SoC Drop Projection |
| SOC nt_susp | 15% | Night-time Suspend SoC: Threshold to Suspend ESS During Night-time and Wake Battery up at Next A1. This Threshold also Used to Trigger Day-time Hibernation Along with SoC Drop Projection |

FIG. 7

METHODS AND SYSTEMS FOR MANAGING STATE OF CHARGE OF AN ENERGY STORAGE SYSTEM DURING OFF-GRID OPERATION

CROSS-REFERENCE TO RELATED APPLICATIONS AND INCORPORATION BY REFERENCE

This application claims priority to U.S. Provisional Patent Application No. 63/144,224 filed on Feb. 1, 2021, which is incorporated by reference herein in its entirety for all purposes.

FIELD

The present disclosure relates to methods and systems for managing state of charge of an energy storage system that is used as a backup power supply source in an electrical system so that the electrical system can operate as a microgrid for an extended period of time.

BACKGROUND

Existing backup power supply systems, such as photovoltaic (PV) systems, integrated with commercial buildings or residential homes typically operate as a microgrid—a group of interconnected loads and local power sources acting independent to the utility grid—when there is a power outage. Existing PV systems usually include energy storage devices, such as batteries, to store energy when PV power output exceeds load demand and to provide energy when PV power output cannot match load demand during microgrid formation.

However, existing backup power supply systems have difficulty sustaining battery charge at an operable range to meet load demand when there has been a power outage or lost access to the utility grid for an extended period of time. For example, power outages can last for more than several days due, for example, to natural disasters. Users may also lose access to the utility grid when integrating the backup power supply system with mobile housing.

By not sustaining battery charge at an operable range, existing backup power supply systems cannot provide sufficient amount of power to meet load demands when losing grid connection for extended periods of time. Moreover, complete or near complete discharge of batteries can cause harm to the energy storage devices and curtail the battery lifetime.

BRIEF SUMMARY

Accordingly, there is a need, for example, for procedures and systems that improve control over the state of charge of energy storage systems during backup mode so that the electrical system can operate in backup mode for an extended period of time, for example multiple days or weeks.

In some embodiments, the present disclosure provides an electrical system. In some embodiments, the electrical system includes an energy control system electrically coupled to a plurality of backup loads. In some embodiments, the electrical system includes a photovoltaic (PV) power generation system electrically coupled to the energy control system, the PV power generation system configured to generate power. In some embodiments, the electrical system includes an energy storage system electrically coupled to the energy control system. In some embodiments, the energy storage system includes a battery configured to store the power generated by the power generation system and configured to discharge the stored power to the energy control system. In some embodiments, the energy storage system includes a storage converter electrically coupled to the battery and electrically coupled to the energy control system. In some embodiments, the energy storage system is configured to operate according to a selected mode of operation that includes: (i) a normal mode, in which the battery and the storage converter are activated to discharge stored power to the energy control system, (ii) a hibernation mode, in which the storage converter is deactivated to prevent the discharge of stored power from the energy storage system to the energy control system, and (iii) a suspension mode, in which the battery and the storage converter are deactivated.

In some embodiments, the energy control system includes a controller configured to detect or estimate a current time of a day and receive electronic data from the electrical system. In some embodiments, the controller is configured to determine the selected mode of operation for the energy storage system based on the electronic data and the current time of the day.

In some embodiments, the controller is configured to repeat selecting the mode of operation for the energy storage system according to a schedule of activation attempts stored in the controller.

In some embodiments, the electronic data indicates a predicted power output of the power generation system and a predicted load demand by the plurality of backup loads. In some embodiments, the predicted power output is based on the average power output of the power generation system profiled over a day of time. In some embodiments, the predicted load demand is based on the average load consumption by the plurality of backup loads profiled over a day of time. In some embodiments, the electronic data indicates a current state of charge of the battery and a monitored discharge rate of the battery.

In some embodiments, the controller is configured to set the mode operation to the suspension mode when the current time is during a first time period, the current state of charge of the battery is less than a first suspension threshold, and the battery has been discharging for a first duration of time. In some embodiments, the controller is configured to set the mode operation to the suspension mode when the current time is during a second time period, the current state of charge of the battery is less than a second suspension threshold, and the battery has been discharging for the first duration of time.

In some embodiments, the first suspension threshold is in a range from approximately 5% to approximately 9% of a rated capacity of the battery. In some embodiments, the second suspension threshold is in a range from approximately 13% to approximately 17% of a rated capacity of the battery. In some embodiments, the first duration of time is in a range from approximately 3 minutes to approximately 7 minutes.

In some embodiments, the first time period is when a predicted power output of the power generation system is greater than a predicted load demand by the plurality of backup loads. In some embodiments, the second time period is when the predicted power output of the power generation system is less than the predicted load demand by the plurality of backup loads.

In some embodiments, the predicted power output is based on an average power output of the power generation system profiled over a day of time. In some embodiments, the predicted load demand is based on the average load consumption by the plurality of backup loads profiled over a day of time.

In some embodiments, the controller is configured to set the mode of operation to the hibernation mode when the current state of charge of the battery is less than a first hibernation threshold, and the battery has been discharging for a first duration of time. In some embodiments, the controller is configured to set the mode of operation to the hibernation mode when the current state of charge of the battery is less than a second hibernation threshold, and the monitored discharge rate is greater than a discharge threshold for a second duration of time. In some embodiments, the controller is configured to set the mode of operation to the hibernation mode when the current state of charge of the battery is greater than the first hibernation threshold and less than the second hibernation threshold, and an estimated state of charge drop of the battery is greater than a drop threshold over a third duration of time.

In some embodiments, the first hibernation threshold is in a range from approximately 8% to approximately 12% of a rated capacity of the battery, the second hibernation threshold is in a range from approximately 13% to approximately 17% of a rated capacity of the battery, and the discharge threshold is in the range from approximately 50% to approximately 100% of a maximum current discharged by the battery. In some embodiments, the discharge threshold is in the range from approximately 4 amps to approximately 12 amps.

In some embodiments, the first time duration is in a range from approximately 3 minutes to approximately 7 minutes, the second time duration is in a range from approximately 30 seconds to approximately 90 seconds, and the third duration of time is in a range from approximately 1 hour to approximately 3 hours.

In some embodiments, the present disclosure provides a method for controlling an electrical system having a PV power generation system, an energy storage system, and an energy control system, the energy control system electrically coupled to the power generation system, the energy storage system, and a plurality of loads. In some embodiments, the method includes a step of receiving, by a controller of the energy control system, electronic data from the electrical system. In some embodiments, the method includes a step of detecting a current time of day. In some embodiments, the method includes a step of determining, at a first attempt time, a mode of operation for the energy storage system based on the current time of day and the electronic data.

In some embodiments, the step of determining the mode of operation includes selecting: (i) a normal mode, in which a battery and a storage converter of the energy storage system are activated to discharge power to the energy control system, (ii) a hibernation mode, in which the storage converter of the energy storage system is deactivated to prevent discharge of power from the energy storage system to the energy control system, or (iii) a suspension mode, in which the battery and the storage converter of the energy storage system are deactivated.

In some embodiments, the method further includes a step of determining, at a second attempt time, the mode of operation for the energy storage system after waiting a predetermined amount of time after the first attempt time. In some embodiments, the predetermined amount of time is based on a predetermined schedule of activation attempts.

In some embodiments, the electronic data indicates a predicted power output by the PV power generation system profiled over a day of time, a predicted load demand by the plurality of loads profiled over a day of time, a current state of charge of the battery and a monitored discharge rate of the battery, or a combination thereof.

In some embodiments, the step of determining the mode of operation includes determining whether the current time of day is within a first time period defined when the predicted power output is greater than the predicted load demand. In some embodiments, the step of determining the mode of operation includes determining whether the current time is within a second time period defined when the predicted power output is less than the predicted load demand.

In some embodiments, the step of determining the mode of operation includes selecting the suspension mode when the current time of day is during the first time period, the current state of charge of the battery is less than a first suspension threshold, and the battery has been discharging for a first duration of time. In some embodiments, the step of determining the mode of operation includes selecting the suspension mode when the current time of day is during the second time period, the current state of charge of the battery is less than a second suspension threshold, and the battery has been discharging for the first duration of time.

In some embodiments, the step of determining the mode of operation includes selecting the hibernation mode when the current time of day is during the first time period and when the current state of charge of the battery is less than a first hibernation threshold, and the battery has been discharging for a first duration of time. In some embodiments, the step of determining the mode of operation includes selecting the hibernation mode when the current time of day is during the first time period and when the current state of charge of the battery is less than a second hibernation threshold, and the measured discharge rate is greater than a discharge threshold for a second duration of time. In some embodiments, the step of determining the mode of operation includes selecting the hibernation mode when the current time of day is during the first time period and when the current state of charge of the battery is greater than the first hibernation threshold and less than the second hibernation threshold, and an estimated state of charge drop of the battery is greater than a drop threshold over a third duration of time.

BRIEF DESCRIPTION OF THE FIGURES

The accompanying drawings, which are incorporated herein and form part of the specification, illustrate embodiments and, together with the description, further serve to explain the principles of the embodiments and to enable a person skilled in the relevant art(s) to make and use the embodiments.

FIG. 6 illustrates a table showing a schedule of activation attempts for selecting a mode of operation of an energy storage system according to an embodiment.

FIG. 7 illustrates a table showing suspension and hibernation thresholds according to an embodiment.

Figure 1:
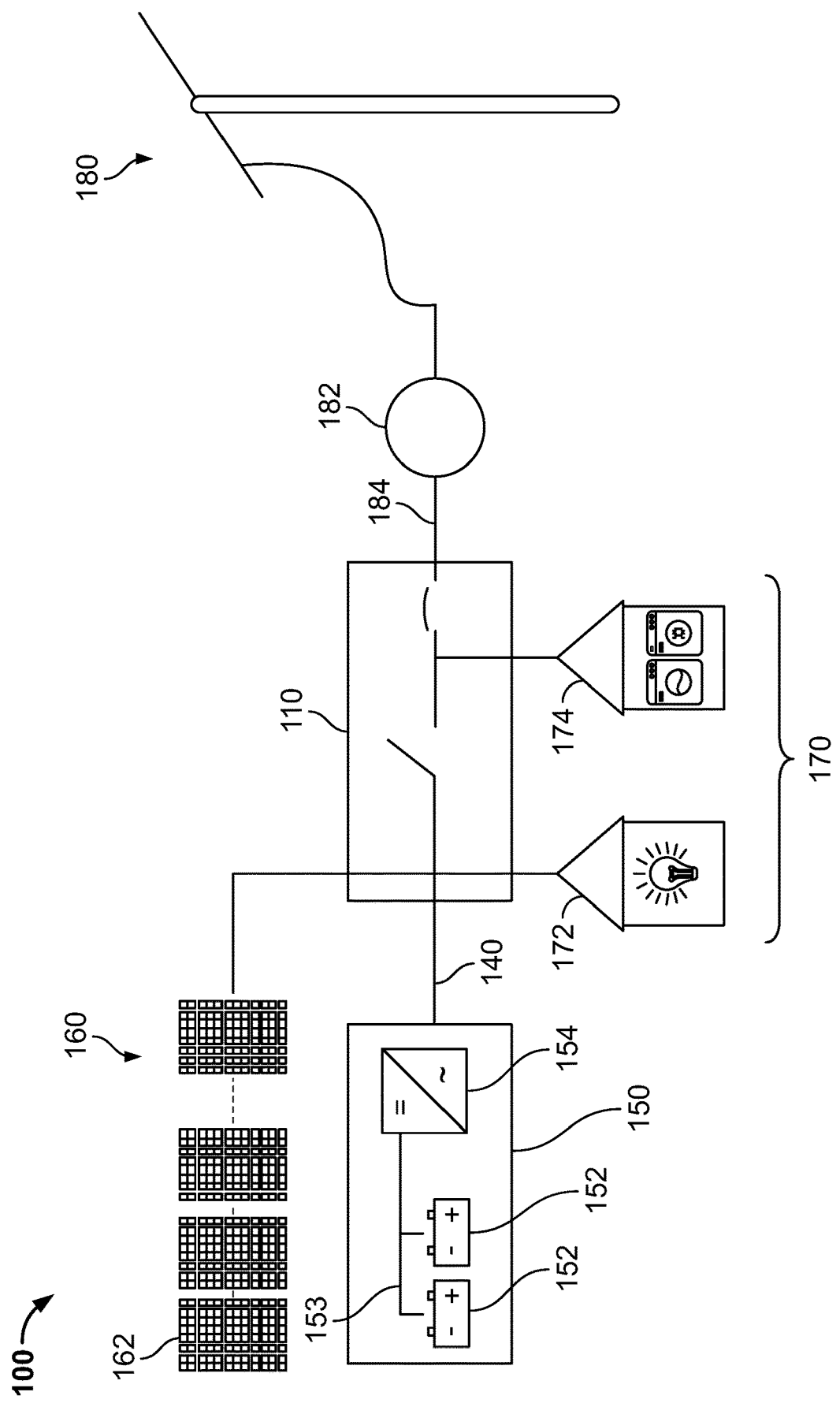
FIG. 1 illustrates an electrical system according to an embodiment.

The features and advantages of the embodiments will become more apparent from the detail description set forth below when taken in conjunction with the drawings. A person of ordinary skill in the art will recognize that the drawings may use different reference numbers for identical, functionally similar, and/or structurally similar elements, and that different reference numbers do not necessarily indicate distinct embodiments or elements. Likewise, a person of ordinary skill in the art will recognize that functionalities described with respect to one element are equally applicable to functionally similar, and/or structurally similar elements.

DETAILED DESCRIPTION

Embodiments of the present disclosure are described in detail with reference to embodiments thereof as illustrated in the accompanying drawings. References to "one embodiment," "an embodiment," "some embodiments," "certain embodiments," etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "about" or "substantially" or "approximately" as used herein refer to a considerable degree or extent. When used in conjunction with, for example, an event, circumstance, characteristic, or property, the term "about" or "substantially" or "approximately" can indicate a value of a given quantity that varies within, for example, 1-15% of the value (e.g., ±1%, ±2%, ±5%, ±10%, or ±15% of the value), such as accounting for typical tolerance levels or variability of the embodiments described herein.

The terms "micro-grid," "backup mode," and "off-grid" as used herein refer to group of interconnected loads (e.g., plurality of backup loads) and power distribution resources (e.g., backup PV power generation system, energy storage system, and energy control system) that function as a single controllable power network independent to the utility grid.

The terms "upstream" and "downstream" as used herein refer to the location of a component of the electrical system with respect to the direction of current or power supply. For example, a first component is located "upstream" of a second component when current is being supplied from the first component to the second component, and a first component is located "downstream" of a second component when current is being supplied from the second component to the first component.

The term "main circuit breaker" as used herein refers to a circuit breaker configured to disrupt power supply from the utility feed to all or substantially all the plurality of loads associated with the electrical system.

The following examples are illustrative, but not limiting, of the present embodiments. Other suitable modifications and adaptations of the variety of conditions and parameters normally encountered in the field, and which would be apparent to those skilled in the art, are within the spirit and scope of the disclosure.

When existing backup power supply systems for commercial buildings or residential homes operate in microgrid formation, the controller of the backup system typically relies on energy storage devices to store energy when PV power output exceeds load demand and to provide energy when PV power output cannot match load demand. However, PV power output and load demand in the backup power supply systems can change dynamically, for example, due to changing load consumption usage or weather forecast changes. Sometimes, load demand substantially exceeds the PV power output, thereby forcing backup supply power system to fully discharge the energy storage devices to make up for the lack of PV power output. The chances for existing backup power supply systems to fully discharge energy storage devices increases significantly when losing access to utility power (e.g., power outage) for an extended period of time, such as several days or weeks.

Thus, there is a need for procedures and systems that allow the energy control system to manage the operation of the energy storage system efficiently so that the electrical system can operate in backup mode for an extended period of time (e.g., multiple days or weeks) without discharging the energy storage system below a critical threshold rating.

According to embodiments described herein, methods of the present disclosure for managing the state of charge for an energy storage system with an electrical system can overcome one or more of these deficiencies, for example, by providing an energy storage system that can operate in a selected mode of operation that includes: (i) a normal mode, in which the battery and the storage converter are activated to discharge power to an energy control system, (ii) a hibernation mode, in which the storage converter is deactivated to prevent the discharge of power from the energy storage system to the energy control system, and (iii) a suspension mode, in which the battery and the storage converter are deactivated. In some embodiments, a controller of the energy control system can determine the selected mode of operation for the energy storage system based on the current time of the day and electronic data related to the backup PV power generation system, the energy storage system, and the plurality of loads.

By selecting the proper mode of operation for the energy storage system during backup mode, the energy control system can manage the state of charge of the energy storage system in a manner that allows the electrical system to operate in backup mode for an extended period of time, such as days or weeks without being connected to the grid.

Figure 2:
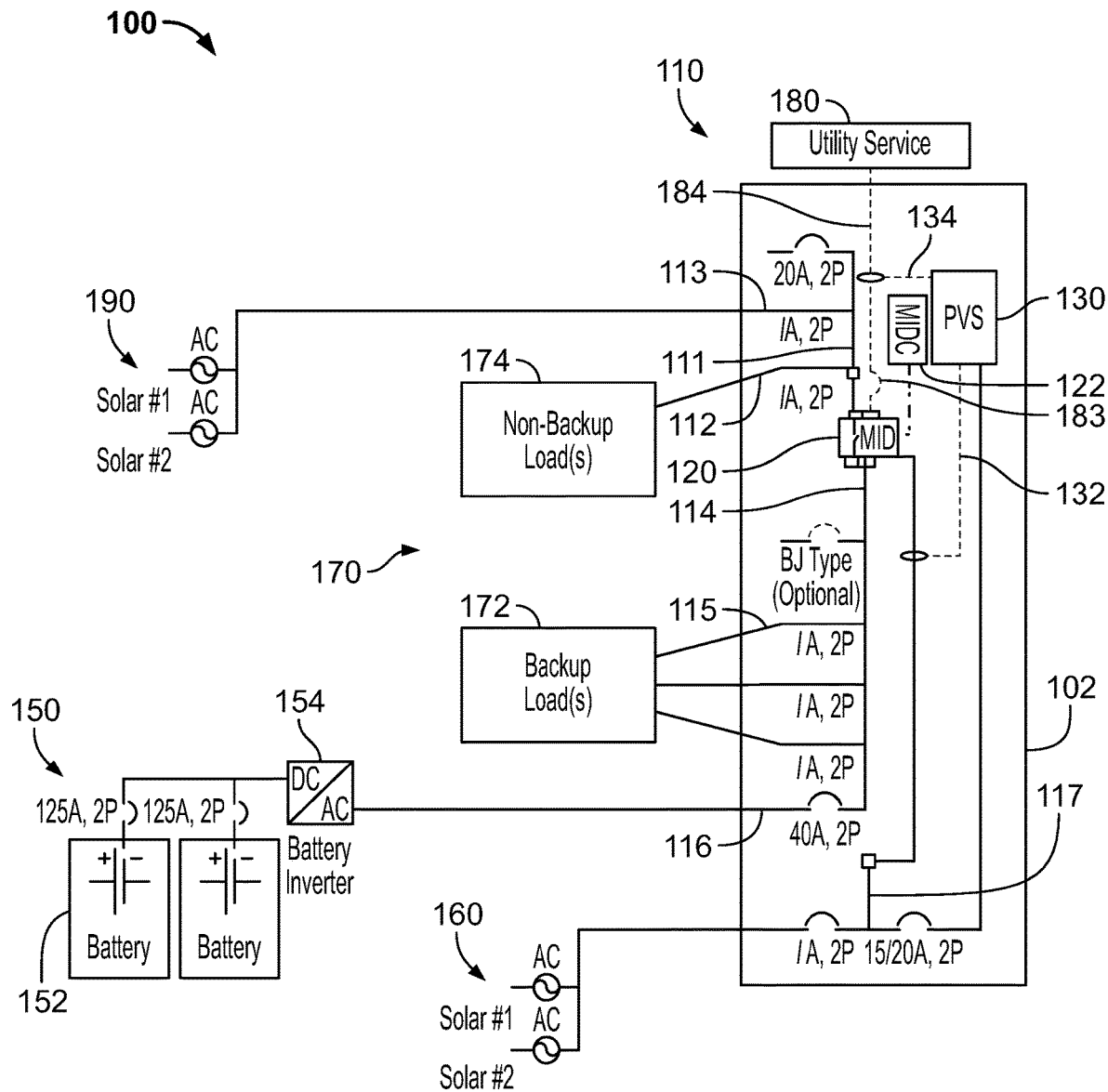
FIG. 2 illustrates an electrical system according to an embodiment.

FIGS. 1 and 2 show an energy control system 110 for controlling the operation of an electrical system 100 according to embodiments. Electrical system 100 can include, for example, an energy storage system 150, a backup photovoltaic ("PV") power system 160, a plurality of electrical loads 170, a connection (e.g., a power bus with a subpanel and/or meter 182) to a utility grid 180, and/or a non-backup backup PV system (e.g., non-backup PV power generation system 190 shown in FIG. 2). In some embodiments, energy control system 110 can control the flow of energy between energy storage system 150, backup PV system 160, the plurality of electrical loads 170, the connection to the utility grid 180, and/or non-backup PV system 190. In some embodiments, energy control system 110 and electrical system 100 can include any component or be operated in any way, as disclosed in U.S. application Ser. No. 16/811,832, filed Mar. 6, 2020, titled "ENERGY CONTROL SYSTEM," the entirety of which is incorporated herein by reference.

In some embodiments, energy storage system 150 can include one or more batteries 152 configured to store power generated by backup PV power generation system 160. In some embodiments, energy storage system 150 can include a storage converter 154 (e.g., inverter) electrically coupled to the batteries 152 by a direct current (DC) bus 153 and electrically coupled to energy control system 110 by an alternating current (AC) bus 140. In some embodiments, storage converter 154 can be configured to convert the DC current discharged from batteries 152 to an AC current that emulates power characteristics (e.g., voltage magnitude and frequency) of utility grid 180, such as for example, split phase AC at 240V/120V. In some embodiments, storage converter 154 can be configured to covert AC to DC. In some embodiments, storage converter 154 can be configured to adjust a charging rate and/or a discharging rate of the one or more batteries 152. In some embodiments, storage converter 154 can be configured adjust the frequency of power supplied by backup PV power generation system 160.

In some embodiments, backup PV system 160 can include one or more power generation arrays (e.g., a photovoltaic panel array), and each power generation array can include one or more power generation units 162 (e.g., a photovoltaic panel) configured to generate power. In some embodiments, backup PV system 160 can include one or more PV converters (e.g., a microinverter). In some embodiments, the PV converter can include any type of components (e.g., an inverter) such that the PV converter is configured to convert DC to AC or vice versa. In some embodiments, at least one PV converter can synchronize the phase of the power feed to split-phase AC that is compatible with the utility grid. In some embodiments, the PV converter can be a part of power generation unit. In some embodiments, one, two, three, four, or more power generation units can be interconnected to a single PV converter (e.g., a string inverter). In some embodiments, backup PV system 160 can include one or more power optimizers such as, for example, DC power optimizers. In some embodiments, backup PV system 160 can include a feed circuit configured to distribute power to the energy control system 110.

In some embodiments, the plurality of electrical loads 170 can be separated into backup load(s) 172 and non-backup load(s) 174. In some embodiments, a plurality of backup loads 172 include one or more essential loads that continue to receive power from the backup PV system 160 and/or energy storage system 150 during a power grid outage, and a plurality of non-backup loads 174 includes one or more non-essential loads that do not receive power from the backup PV system 160 and/or energy storage system 150 during a utility power outage. In the context of the present disclosure, an electrical load can be, for example, one or more devices or systems that consume electricity. In some embodiments, the plurality of electrical loads 170 can include all or some of the electrical devices associated with a building (e.g., a residential home). In some embodiments, the plurality of electrical loads 170 can include 240-volt loads. In some embodiments, the plurality of electrical loads 170 can include, for example, an electric range/oven, an air conditioner, a heater, a hot water system, a swimming pool pump, and/or a well pump. In some embodiments, the plurality of electrical loads 170 can include 120-volt loads. In some embodiments, the plurality of electrical loads 170 can include, for example, power outlets, lighting, network- ing and automation systems, a refrigerator, a garbage disposal unit, a dishwasher, a washing machine, other appliance, a septic pump, and/or an irrigation system.

In some embodiments, non-backup PV system 190 can include one or more power generation arrays (e.g., a photovoltaic panel array), and each power generation array can include one or more power generation units (e.g., a photovoltaic panel). In some embodiments, non-backup PV system 190 can include one or more PV converters. In some embodiments, PV converter can include the features of any one of the converters described herein.

In some embodiments, energy control system 110 can include any number of interconnections to control the flow of energy between energy storage system 150, backup PV system 160, the plurality of loads 170, utility grid 180, and/or non-backup PV system 190. For example, in some embodiments, energy control system 110 can include a grid interconnection 184 electrically coupled to a utility grid 180 so that grid power is distributed to energy control system 110. In some embodiments, grid interconnection 184 can include a main overcurrent protection device 183 that is electrically disposed between utility grid 180 and other components of energy control system 110. In some embodiments, energy control system 110 can include a non-backup power bus 111 (e.g., 125 A rating bus) having one or more non-backup load interconnections 112 electrically coupled to the plurality of non-backup loads 174 and a non-backup PV interconnection 113 electrically coupled to non-backup PV system 190. In some embodiments, energy control system 110 can include a backup power bus 114 (e.g., 200 A rating bus) having one or more backup load interconnections 115 electrically coupled to the plurality of backup loads 172 and a storage interconnection 116 electrically coupled to energy storage system 150. In some embodiments, energy control system 110 can include a backup photovoltaic interconnection 117 (e.g., 125 A rating bus) electrically coupled to backup PV system 160. In the context of the present disclosure, an interconnection includes any suitable electrical structure, such as a power bus, wiring, a panel, etc., configured to establish electrical communication between two sets of circuits. Any one of interconnections 112, 113, 115, 116, 117, and 184 can include an AC bus, a panel, a subpanel, a circuit breaker, any type of conductor, or a combination thereof.

In some embodiments, energy control system 110 can include a microgrid interconnection device 120 (e.g., an automatic transfer or disconnect switch) electrically coupled to non-backup power bus 111 (e.g., located on a load side of microgrid interconnection device 120) and backup power bus 114 (e.g., located on a line side of microgrid interconnection device 120), such that microgrid interconnection device 120 is electrically coupled to non-backup load interconnection 112, non-backup PV interconnection 113, backup load interconnection 115, storage interconnection 116, and/or backup PV interconnection 117. In some embodiments, microgrid interconnection device 120 is electrically coupled (e.g., directly) to grid interconnection 184. In the context of the present disclosure, a microgrid interconnection device can be, for example, any device or system that is configured to automatically connect circuits, disconnect circuits, and/or switch one or more loads between power sources. In some embodiments, microgrid interconnection device 120 can include any combination of switches, relays, and/or circuits to selectively connect and disconnect respective interconnections 150, 112, 113, 115, 116, 117, and 184 electrically coupled to energy control system 110. In some embodiments, such switches can be automatic disconnect switches that are configured to automatically connect circuits and/or disconnect circuits. In some embodiments, such switches can be transfer switches that are configured to automatically switch one or more loads between power sources.

In some embodiments, microgrid interconnection device 120 can be configured to operate in an on-grid mode, in which microgrid interconnection device 120 electrically connects the backup power bus 114 to both the non-backup power bus 111 and grid interconnection 184. In some embodiments, when operating in the on-grid mode, microgrid interconnection device 120 can be configured to distribute power received from utility grid 180 and/or non-backup PV system 190 to backup loads 172. In some embodiments, when operating in the on-grid mode, microgrid interconnection device 120 can be configured to distribute power received from energy storage system 150 and/or backup PV power generation system 160 to non-backup loads 174 and/or utility grid 180.

In some embodiments, microgrid interconnection device 120 can be configured to operate in a backup mode, in which microgrid interconnection device 120 electrically disconnects both non-backup power bus 111 and grid interconnection 184 from backup power bus 114 and backup PV interconnection 160. In some embodiments, when operating in the backup mode, microgrid interconnection device 120 can disrupt power received from non-backup PV system 190 from reaching backup loads 172. In some embodiments, when operating in the backup mode, microgrid interconnection device 120 can disrupt electrical communication between backup loads 172 and utility grid 180. In some embodiments, when operating in the backup mode, microgrid interconnection device 120 can disrupt power received from energy storage system 150 and/or backup PV system 160 from reaching non-backup loads 174 and/or utility grid 180.

In some embodiments, energy control system 110 can include a controller 122 in communication with microgrid interconnection device 120 and configured to control the distribution of power between energy storage system 150, backup PV system 160, the plurality of electrical loads 170, utility grid 180, and/or non-backup PV system 190. In some embodiments, controller 122 can be configured to detect the status (e.g., power outage or voltage restoration) of grid interconnection 184 and switch microgrid interconnection device 120 between the on-grid mode and the backup mode based on the status of grid interconnection 184. If the status of grid interconnection 184 indicates a power outage, controller 122 can be configured to switch microgrid interconnection device 120 to the backup mode. If the status of grid interconnection 184 indicates a voltage restoration, controller 122 can be configured to switch microgrid interconnection device 120 to the on-grid mode.

In some embodiments, energy control system 110 includes a PV monitoring system 130. In some embodiments, PV monitoring system 130 includes a communication interface (e.g., one or more antennas) for sending and/or receiving data over a wireless network. In some embodiments, energy control system 110 includes one or more load meters that monitor the current or voltage through certain elements of electrical system 200 and transmit data indicating the monitored current or voltage to PV monitoring system 130 and controller 122. For example, a load meter can monitor the flow of electricity from microgrid interconnection device 120 to backup load interconnection 115. A load meter can monitor the flow of electricity from microgrid interconnection device 120 to backup PV interconnection 117 and non-backup PV interconnection 113. A load meter can monitor the flow of electricity from utility grid 180 to microgrid interconnection device 120.

In some embodiments, PV monitoring system 130 can include a site consumption current transformer 132 (site CT) for monitoring the quantity of energy consumption by the plurality of electrical loads 170. In some embodiments, site CT 132 can be operatively connected to grid interconnection 184. In some embodiments, PV monitoring system 130 can include a PV production CT 134 for monitoring the quantity of PV energy outputted from backup PV system 160. In some embodiments, PV production CT 134 can be operatively linked to backup PV interconnection 117.

In some embodiments, PV monitoring system 130 can read timeseries data and/or disable a reconnection timer of backup PV system 160 and/or non-backup PV system 190. In some embodiments, PV monitoring system 130 can initiate a grid reconnection timer of backup PV system 160. In some embodiments, PV monitoring system 130 can communicate with a battery monitoring system ("BMS") of energy storage system 150. In some embodiments, PV monitoring system 130 can communicate with energy storage system 150 and can, for example, read timeseries data, read power information, write charge/discharge targets, and/or write "heartbeats." In some embodiments, PV monitoring system 130 can receive status and/or power information from microgrid interconnection device 120.

In some embodiments, controller 122 can be linked (e.g., wired or wirelessly) to PV monitoring system 130 such that controller 122 receives electronic data related to backup PV system 160 and/or non-backup PV system 190 from PV monitoring system 130. In some embodiments, controller 122 can transmit commands to PV monitoring system 130 to adjust (e.g., increase or decrease) power output of backup PV system 160 and/or non-backup PV system 190 based on received data. In some embodiments, controller 122 can be configured as a master controller and PV monitoring system 130 can be configured to communicate electronic data (e.g., status of power generation) with controller 122 such that controller 122 controls control energy distribution based on the electronic data transmitted by PV monitoring system 130.

In some embodiments, controller 122 and/or a controller of PV monitoring system 130 can receive and transmit electronic data (e.g., computer-processable data and/or information represented by an analog or digital signal) over a network, such as, for example, Wireless Local Area Network ("WLAN"), Campus Area Network ("CAN"), Metropolitan Area Network ("MAN"), or Wide Area Network ("WAN"), with components of energy storage system 150, backup PV power generation system 160, non-backup PV power generation system 190, a user's device (e.g., user's smartphone or personal computer), smart device (e.g., load meter) and/or smart appliances (e.g., smart outlets, smart plugs, smart bulbs, smart washers, smart refrigerators). In some embodiments, electronic data can include timeseries data, alerts, metadata, outage reports, power consumption information, backup power output information, service codes, runtime data, etc.

In some embodiments, controller 122 and/or a controller of PV monitoring system 130 can receive electronic data (e.g., from a load meter) related to load consumption of the plurality of loads 170, including backup loads 172 and/or non-backup loads 174. In some embodiments, electronic related to the plurality of loads 170 can include the information regarding the amount of power consumed by the plurality of loads 170 (including backup loads 172 and/or non-backup loads 174) and the times at which the power was consumed by the plurality of loads 170. In some embodiments, controller 122 and/or a controller of PV monitoring system 130 may use the collected electronic data to determine a load average per circuit and/or a load average per smart device corresponding to discrete blocks of time throughout the day. For example, time blocks may be broken down into 1-hour blocks, 2-hour blocks, 3-hour blocks, or other time blocks, including, for example, user-designated time blocks (e.g., times when the user may be asleep, at home, or out of the house). In some embodiments, controller 122 may use the collected data to determine an energy demand based on the amount of power consumed by the plurality of loads 170.

Figure 5:
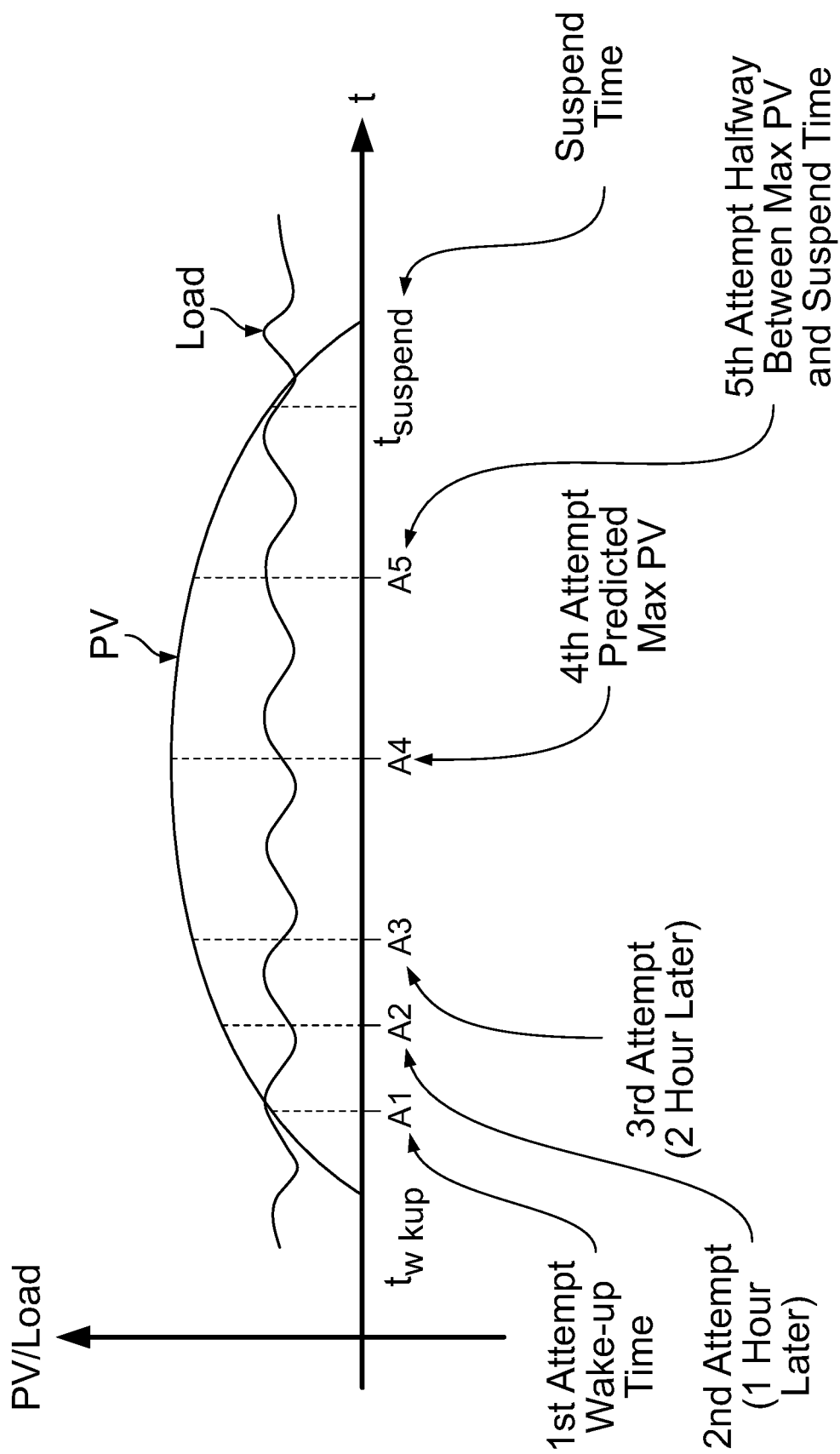
FIG. 5 illustrates a graph showing PV power output and load consumption profiles of an electrical system according to an embodiment.

In some embodiments, controller 122 and/or a controller of PV monitoring system 130 can create a time-of-use library (e.g., a database or other structured set of data) that can define a circuit load average for each load and/or a smart device load average for each smart device with respect to the discrete blocks of time throughout the day. In some embodiments, controller 122 and/or a controller of PV monitoring system 130 can use this information to determine which backup loads 172 receive power as a default during a grid power outage. In some embodiments, controller 122 and/or a controller of PV monitoring system 130 can use this information to average load consumption by the plurality of backup loads 172 and/or non-backup loads 174 profiled over a day of time. For example, FIG. 5 illustrates a graph profiling the average load consumption by the plurality of backup loads 172 over a day of time. In some embodiments, controller 122 and/or a controller of PV monitoring system 130 can use this information to predict the load demand by plurality of backup loads 172 and/or non-backup loads 174. In some embodiments, the controller 122 and/or a controller of PV monitoring system 130 can use the average load demand by the plurality of backup loads 172 and/or non-backup loads 174 to be the predicted load demand.

In some embodiments, the converter of backup PV power generation system 160 can transmit to controller 122 and/or a controller of PV monitoring system 130 electronic data related to backup PV power generation system 160. In some embodiments, electronic data related to backup PV power generation system 160 can include a current (e.g., an instantaneous) power output of backup PV power generation system 160. In some embodiments, electronic data related to backup PV power generation system 160 can include historical power output measurements of backup PV power generation system 160 recorded over an extended period of time (e.g., days, weeks, months). In some embodiments, electronic data related to backup PV power generation system 160 can include the average power output of the backup PV power generation system 160 profiled over a day of time. For example, FIG. 5 illustrates a profile of the average power output of the backup PV power generation system 160 over a day of time. In some embodiments, controller 122 and/or a controller of PV monitoring system 130 can calculate a predicted power output of backup PV power generation system 160 based on the historical data and other information, such as, for example, weather forecasts and state of the power generation arrays (e.g., power output capacity). In some embodiments, controller 122 and/or a controller of PV monitoring system 130 uses the average power output of the backup PV power generation system 160 as a predicted power output for controlling operations of electrical system 100.

In some embodiments, storage converter 154 of energy storage system 150 can transmit to controller 122 and/or a controller of PV monitoring system 130 electronic data related to energy storage system 150. In some embodiments, electronic data related to energy storage system 150 can include information relating to the amount of energy currently stored in energy storage system 150 (e.g., a current state of charge) and/or the amount of energy that energy storage system 150 is capable of absorbing (e.g., via charging). In some embodiments, electronic data related to energy storage system may include the amount of energy being discharged (e.g., current discharging rate and/or the duration of the battery discharging) or predicted to be discharged (e.g., based on a time-of-use library) from energy storage system 150.

In some embodiments, electrical components (e.g., interconnections, switches, relays, AC bus) of energy control system 110 can be integrated into a single housing. For example, as shown in FIG. 2, in some embodiments, energy control system 110 can include a housing 102. In some embodiments, electrical components (e.g., interconnections, switches, relays, AC bus) of energy control system 110 can be disposed in multiple housings, such as for, example, a panel disposed in a home building and a subpanel disposed in a garage or pool house.

In some embodiments, controller 122 and/or a controller of PV monitoring system 130 can be configured to communicate with energy storage system 150. For example, in some embodiments, controller 122 and/or a controller of PV monitoring system 130 may be configured to control the mode of operation of energy storage system 150 (e.g., whether or not the system provides power to other portions of electrical system 100) or the state of portions of energy storage system 150 (e.g., particular converters 154 and/or batteries 152). In some embodiments, storage converters 154 and/or batteries 152 may receive commands from controller 122 and/or a controller of PV monitoring system 130 and can change their mode of operation (e.g., whether or not the converters and/or batteries provide power to other portion of electrical system 100) based on the commands received from controller 122 and/or a controller of PV monitoring system 130. In some embodiments, batteries 152 can receive commands from storage converters 154 and can change their mode of operation (e.g., whether or not the batteries provide power to other portion of electrical system 100) based on the commands received from storage converters 154.

In some embodiments, energy storage system 150 can be operated in different modes to conserve the state of charge of batteries 152, such as, for example, when the microgrid interconnection device 120 is set in the backup mode during a power outage.

In some embodiments, energy storage system 150 can be configured to operate in a normal mode, in which batteries 152 and storage converter 154 are activated to discharge stored power to the energy control system 110 and/or receive power for charging batteries 152. In some embodiments, when set in normal mode, both DC bus 153 and AC bus 140 are kept charged to allow charging and discharging of batteries 152.

In some embodiments, energy storage system 150 can be configured to operate in a hibernation mode, in which storage converter 154 is deactivated to prevent the discharge of power from energy storage system 150 to the energy control system 110. In some embodiments, when set in hibernation mode, AC bus 140 is shut off, while DC bus 153 is kept charged, thereby slowing and/or stopping discharge of battery 152.

In some embodiments, energy storage system 150 can be configured to operate in a suspension mode, in which both batteries 152 and storage converter 154 are deactivated to stop discharge of batteries 152. In some embodiments, when set in suspension mode, both AC bus 140 and DC bus 153 are shut off, which prevents any drainage of batteries 152.

In some embodiments, controller 122 and/or a controller of PV monitoring system 130 can be configured to determine the mode of operation for energy storage system 150 based on the current time of day and electronic data related to electrical system 100 (as described herein) to preserve the state of charge in energy storage system 150 (e.g., batteries 152), such as, for example, while operating in backup mode for an extended period of time (e.g., multiple days to several weeks). In some embodiments, controller 122 and/or a controller of PV monitoring system 130 can be configured to determine the mode of operation for energy storage system 150 by executing an algorithm (e.g., stored as an instruction in computer readable medium) that takes into account the current state of charge of energy storage system 150 in relation to various state of charge thresholds (e.g., suspension threshold and hibernation threshold described below), the predicted PV power output by the backup PV power generation system 160 (e.g., as described above), and the predicted load consumption by the plurality of backup loads 172 (e.g., as described above).

In some embodiments, controller 122 and/or a controller of PV monitoring system 130 can be configured to determine whether to set energy storage system 150 in the normal mode, the hibernation mode, or the suspension mode by determining whether the current time of day falls within a first time period of the day (e.g., daytime) or a second time period of day (e.g., nighttime). In some embodiments, the first time period can be when a predicted backup PV power output is greater than a predicted load demand (e.g., during daylight hours). In some embodiments, the second time period can be when the predicted power output of the power generation system is less than the predicted load demand by the plurality of backup loads (e.g., during nighttime). For example, as shown in FIG. 5, the PV power output surpasses the load consumption between 9 AM and 6 PM, thereby defining the first time period from 9 AM to 6 PM. And as shown in FIG. 5, for example, the predicted time when load consumption surpasses PV power output is between 6 PM and 9 AM, thereby defining the second time period from 6 PM to 9 AM. Other timeframes are contemplated within the scope of the present disclosure (e.g., 6 AM to 5 PM and 5 PM to 6 AM; 7 AM to 6 PM and 6 PM to 7 AM). In some embodiments, the first time period can be from sunrise to sunset and the second time period can be from sunset to sunrise. In some embodiments the first time period is shorter than the second time period. In some embodiments the first time period is longer than the second time period. In some embodiments the first time period is equal to the second time period.

In some embodiments, the predicted backup PV power output used for determining the first and second time periods of the day can be the average backup PV power output calculated over a first historical time period (e.g., days, weeks, months). In some embodiments, the predicted load demand used for determining the first and second time periods of the day can be the average load consumption by the plurality of backup loads 172 and/or non-backup loads 174 calculated over a second historical time period (e.g., days, weeks, months). In some embodiments, the first historical time period used for determining the average backup PV power output can be longer or shorter than the second historical time period used for determining the average load consumption. For example, the first historical time period can be set at multiple weeks to use more data for determining the average backup PV power output, whereas the second historical time period can be set at one week to determine the user's most recent load consumption habits.

In some embodiments, controller 122 and/or a controller of PV monitoring system 130 can be configured to determine whether to set energy storage system 150 in the normal mode, the hibernation mode, or the suspension mode by comparing the current state of charge of energy storage system 150 to state of charge thresholds (e.g., suspension threshold and hibernation threshold) stored in the instructions of the memory. For example, FIG. 7 shows a set of thresholds for determining the mode of operation according to some embodiments. In some embodiments, as shown in FIG. 7, the state of charge thresholds can include a cutoff threshold to drop the backup (e.g., microgrid) operation of energy storage system. In some embodiments, the cutoff threshold can be set in a range from approximately 3% to approximately 7% of a rated capacity of the battery, such as, for example, 5% of the rated capacity of the battery 152, as shown in FIG. 7.

In some embodiments, as shown in FIG. 7, the state of charge thresholds can include a first suspension (e.g., dt_susp) threshold that is used during the first time period (e.g., during the day). In some embodiments, the first suspension threshold can be set in a range from approximately 5% to approximately 9% of a rated capacity of the battery, such as, for example, 7% of the rated capacity of the battery 152, as shown in FIG. 7. In some embodiments, the range of the first suspension threshold can be set in a range from approximately 3% to approximately 20% of a rated capacity of the battery. In some embodiments, as shown in FIG. 7, the state of charge thresholds can include a second suspension (e.g., nt_susp) threshold that is used during the second time period (e.g., at night). In some embodiments, the second suspension threshold can be set in a range from approximately 13% to approximately 17% of a rated capacity of battery 152, such as, for example, 15% of the rated capacity of the battery 152, as shown in FIG. 7. In some embodiments, the range of the second suspension threshold can be set in a range from approximately 10% to approximately 30% of a rated capacity of the battery. In some embodiments, the first suspension threshold is set significantly lower than the second suspension threshold, such as for example, 5% to 15% difference of rated battery capacity, to reduce the likelihood of suspending energy storage system 150 during a time period when the average backup PV power output typically exceeds load consumption.

In some embodiments, as shown in FIG. 7, the state of charge thresholds can include a first hibernation threshold (e.g., hiber) threshold. In some embodiments, the first hibernation threshold can only be used only during the first time period (e.g., during the day). In some embodiments, the first hibernation threshold can used both during the first time period and the second time period. In some embodiments, the first hibernation threshold can be set in a range from approximately 8% to approximately 12% of a rated capacity of battery 152, such as, for example, 10% of the rated capacity of the battery 152, as shown in FIG. 7. In some embodiments, the first hibernation threshold can be set in a range from approximately 5% to approximately 20% of a rated capacity of battery 152. In some embodiments, the state of charge thresholds can include a second hibernation threshold, which is equivalent to the second suspension (e.g., nt_susp) threshold, and the second hibernation threshold is used only during the first time period (e.g., during the day). In some embodiments, the second hibernation threshold can be set in a range from approximately 13% to approximately 17% of a rated capacity of battery 152, such as, for example, 15% of the rated capacity of the battery 152. In some embodiments, the second hibernation threshold can be set in a range from approximately 10% to approximately 30% of a rated capacity of battery 152. In some embodiments, the first and second hibernation thresholds are set higher than the first suspension threshold so that controller 122 sets energy storage system 150 in the hibernation mode before becoming suspended during the first time period.

In some embodiments, controller 122 and/or a controller of PV monitoring system 130 can be configured to determine whether to set energy storage system 150 in the normal mode, the hibernation mode, or the suspension mode by comparing the discharging state (e.g., the current discharge rate and/or the duration of the battery 152 discharging) to discharge rate or duration thresholds. For example in some embodiments, controller 122 and/or a controller of PV monitoring system 130 can be configured to determine whether energy storage system 150 has been discharging for a first duration of time. In some embodiments, the first duration of time can be set in a range from approximately 3 minutes to approximately 7 minutes, such as, for example, 5 minutes. In some embodiments, controller 122 and/or a controller of PV monitoring system 130 can be configured to determine whether the energy storage system 150 has been discharging for a second duration of time. In some embodiments, the second duration of time can be set in a range from approximately 30 second to approximately 90 seconds, such as, for example, 60 seconds. In some embodiments, controller 122 and/or a controller of PV monitoring system 130 can be configured to determine whether the monitored discharge rate of energy storage system is greater than a first discharge threshold. In some embodiments, the first discharge threshold can be set in a range from approximately 50% to approximately 100% of a maximum current of converter 154, such as, for example, 75% of maximum current of converter 154. In some embodiments, the first discharge threshold can be set in a range from approximately 4 A to approximately 12 A, such as for example, 8 A.

In some embodiments, controller 122 and/or a controller of PV monitoring system 130 can determine whether to set energy storage system 150 in the normal mode, the hibernation mode, or the suspension mode by first estimating a state of charge drop by energy storage system 150 over a third duration of time (e.g., the time until the next activation attempt or reevaluation), and then, determining whether the estimated state of charge drop is greater than a drop threshold over the third duration of time. In some embodiments, the estimated state of charge drop can be determined by calculating a sum of (a) the energy already discharged from battery 152 between the current time and the last activation attempt and (b) the predicted amount of energy discharged from battery 152 between the current time and the next activation attempt (e.g., the third duration of time), and then, dividing the sum of discharged energy over the energy rating (e.g., total energy capacity in kWh) of battery 152 (e.g., Estimated SoC Drop=[Energy Already Discharged+Predicted Energy Discharged]/Energy Rating of Battery). In some embodiments, the drop threshold can be set in a range between 0.5% and 1.5% of the energy rating of battery 152, such as, for example, 1.0% of the energy rating of battery 152. The drop threshold can be set at a particular percentage of the battery's energy rating to indicate whether battery 152 is being discharged at a fast rate.

Figure 8:
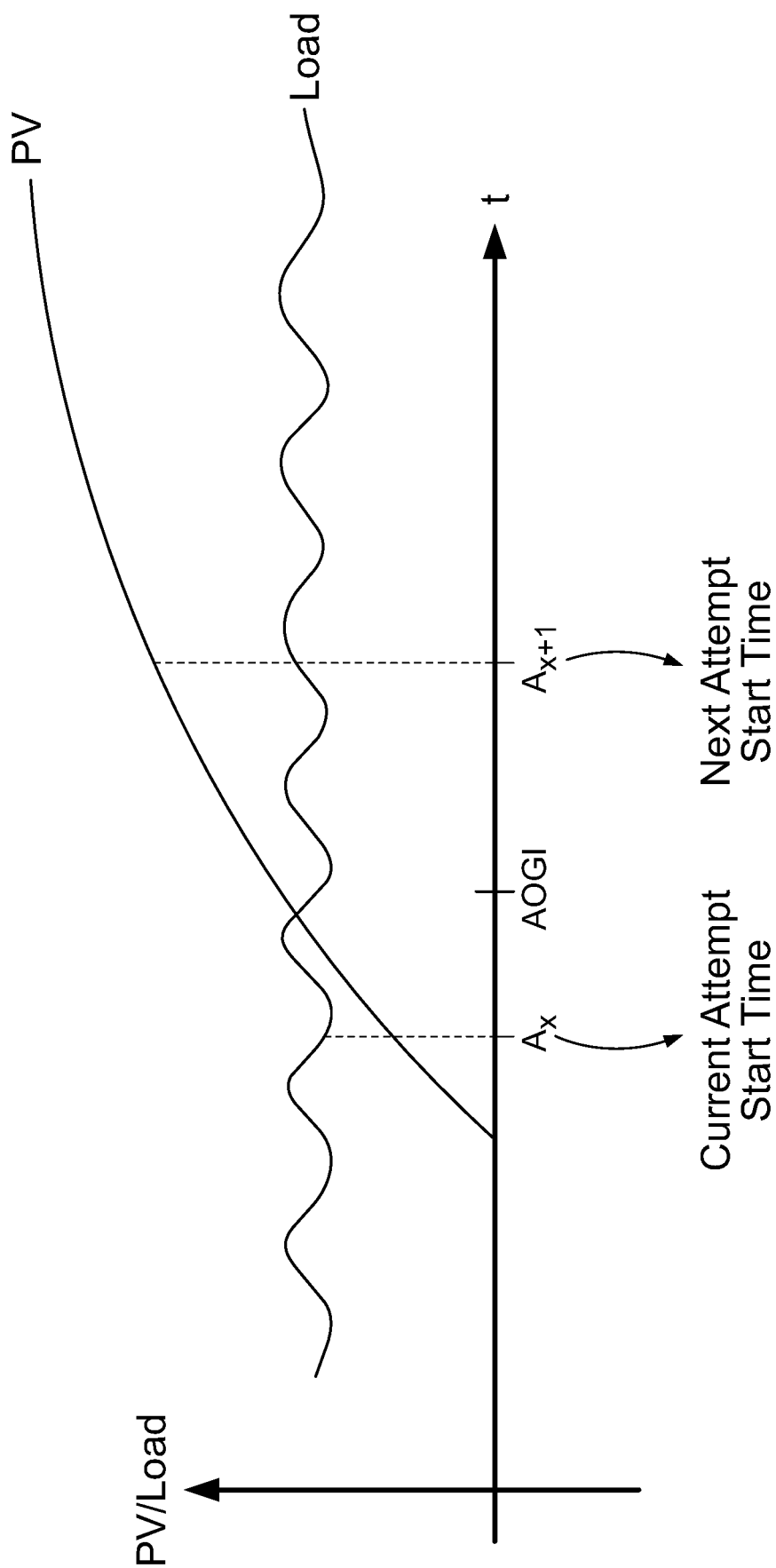
FIG. 8 illustrates a graph showing PV power output and load consumption profiles of an electrical system according to an embodiment.

In some embodiments, the predicted energy discharged from battery 152 used for determining the estimated state of charge drop can be determined by calculating a product of (a) an estimated power (kW) discharged by battery 152 and (b) the third duration of time (e.g., predicted energy discharged=estimated power discharged by battery*third duration of time). In some embodiments, the estimated power discharged by battery 152 is calculated by dividing the energy (KWh) discharged by battery 152 over the first duration of time. In some embodiments, the first duration of time can be in a range between approximately 3 minutes and approximately 7 minutes, such as, for example, 5 minutes. The first duration of time is set at a time period to accurately reflect the most recent discharging rate of battery 152. In some embodiments, the third duration of time is determined by taking the difference of time between the current time and the time of the next activation attempt. For example, FIG. 8 shows and example of the predicted PV power output and the predicted load demand profiled over time, and FIG. 8 shows the occurrence of a first activation attempt (Ax), a current evaluation of energy storage system 150 (now), and a subsequent activation attempt (Ax+1). In some embodiments, the third duration of time can be determined by taking the time measured between current evaluation of energy storage system 150 and the subsequent activation attempt Ax+1 (e.g., third duration of time=Ax+1−now). In some embodiments, the third duration of time can be set in a range from approximately 5 minutes to approximately 5 hours, such as for example, 1 hour to 3 hours.

In some embodiments, controller 122 and/or a controller of PV monitoring system 130 can be configured to set energy storage system 150 in suspension mode when the current time is during the first time period (e.g., daytime), the current state of charge of the battery is less than the first suspension threshold (e.g., 7% SoC), and battery 152 has been discharging for the first duration of time (e.g., 5 minutes). In some embodiments, controller 122 and/or a controller of PV monitoring system 130 can be configured to set energy storage system 150 in suspension mode when the current time is during the second time period (e.g., nighttime), the current state of charge of the battery is less than the second suspension threshold (e.g., 15% SoC), and battery 152 has been discharging for the first duration of time (e.g., 5 minutes).

In some embodiments, controller 122 and/or a controller of PV monitoring system 130 can be configured to set energy storage system in hibernation mode when the current time is during the first time period (e.g., day time), the current state of charge of battery 152 is less than the first hibernation threshold (e.g., 10% SoC), and the battery has been discharging for the first duration of time (e.g., 5 minutes). In some embodiments, controller 122 and/or a controller of PV monitoring system 130 can be configured to set energy storage system in hibernation mode when the current time is during the first time period (e.g., day time), the current state of charge of battery 152 is less than the second hibernation threshold (e.g., 15% SoC), and the measured discharge rate of battery 152 is greater than a discharge threshold for a second duration of time (e.g., 1 minute). In some embodiments, controller 122 and/or a controller of PV monitoring system 130 can be configured to set energy storage system in hibernation mode when the current time is during the first time period (e.g., day time), the current state of charge of battery 152 is greater than the first hibernation threshold (e.g., 10% SoC) and less than second hibernation threshold (e.g., 15% SoC), and the estimated state of charge drop of battery 152 is greater than the drop threshold (e.g., 1% SoC) over the third duration of time (e.g., 1 hour). In some embodiments, controller 122 and/or a controller of PV monitoring system 130 can be configured to avoid setting energy storage system 150 in hibernation mode when the current time is in the second time period.

In some embodiments, controller 122 and/or a controller of PV monitoring system 130 can be configured to repeatedly determine the mode of operation for energy storage system 150 according to a predetermined schedule of activation attempts (e.g., stored as instructions in the memory of controller 122 and/or a controller of PV monitoring system 130). In some embodiments, the schedule of activation attempts can be generated or adapted by the controller 122 and/or a controller of PV monitoring system 130 based on comparing the predicted backup PV power output and the predicted load demand profiled over a day of time. In some embodiments, the predicted backup PV power output can be based on the average PV power output derived from historical PV power output, and the predicted load demand can be based on the average load demand derived from historical load consumption data.

For example, FIG. 6 shows a table of scheduled activation attempts, according to some embodiments, for determining the mode of operation for energy storage system based on the predicted backup PV power output and load demand shown in FIG. 5. As shown in FIG. 5, the predicted time when PV power output surpasses the load consumption is 9 AM, and the predicted time when load consumption surpasses PV power output is 6 PM. In some embodiments, the initial activation attempt (e.g., A1 at $t_{wakeup}$ shown in FIG. 6) during the day for determining the mode of operation is scheduled when the predicted PV power output first surpasses the predicted load demand (e.g., at 9 AM wakeup time). In some embodiments, at the wakeup time, controller 122 and/or a controller of PV monitoring system 130 can be configured to switch energy storage system 150 (e.g., which was set in suspension in the evening before) from suspension mode to normal mode so that any PV power output exceeding load demand can be used to charge batteries 152 of energy storage system 150.

In some embodiments, the last activation attempt $t_{suspend}$ during the day (A6 at $t_{suspend}$ shown in FIG. 6) for determining the mode of operation is scheduled when the predicted load demand surpasses the PV power output for remainder of the day (e.g., at 6 PM suspend time). In some embodiments, at the last activation attempt, controller 122 and/or a controller of PV monitoring system 130 can be configured to switch energy storage system 150 from a normal mode to a suspension mode so that the state of charge is preserved overnight when there is no PV power output to charge energy storage system 150. In some embodiments, at the last activation attempt, controller 122 and/or a controller of PV monitoring system 130 can be configured to switch energy storage system 150 from a normal mode to the hibernation mode for predetermined period of time (e.g., 1 to 2 hours) before switching energy storage system 150 to suspension mode during the night.

In some embodiments, after the wakeup time, controller 122 and/or a controller of PV monitoring system 130 can be configured to periodically determine the mode of operation for energy storage system 150 based on the electronic data (e.g., including the latest received electronic data) and the time of day. In some embodiments, controller 122 and/or a controller of PV monitoring system 130 can determine the mode of operation at intermediate activation attempts (A2, A3, A4, A5) that are already scheduled in the memory of controller 122. For example, in some embodiments, activation attempts (A2, A3, A4, A5) can be spaced apart by 1 to 3 hours. In some embodiments, controller 122 and/or a controller of PV monitoring system 130 can be configured to repeatedly determine the mode of operation between the scheduled activation attempts (A2, A3, A4, A5) based on the detected discharging rate or state of charge of energy storage system 150. For example, if the current state of charge (e.g., 14%) is less than the second hibernation threshold (e.g., 15% SoC) but the estimated state of charge drop until the next activation attempt is less than the drop threshold (e.g., 1% SoC), controller 122 and/or a controller of PV monitoring system 130 can keep energy storage system 150 in normal mode but determine the mode of operation every five minutes to ensure that battery 152 is charged above the second hibernation threshold (e.g., 15% SoC). In another example, if the current state of charge (e.g., 14%) is less than the second hibernation threshold (e.g., 15% SoC) and the estimated state of charge drop until the next activation attempt is greater than the drop threshold (e.g., 1% SoC), controller 122 and/or a controller of PV monitoring system 130 can set energy storage system 150 to hibernation mode and wait to determine the mode of operation until the next activation attempt. Thus, in some embodiments, controller 122 and/or a controller of PV monitoring system 130 can be configured to adjust the rate of determining the mode of operation based on monitored parameters, such as current state of charge and the discharging rate.

Figure 3:
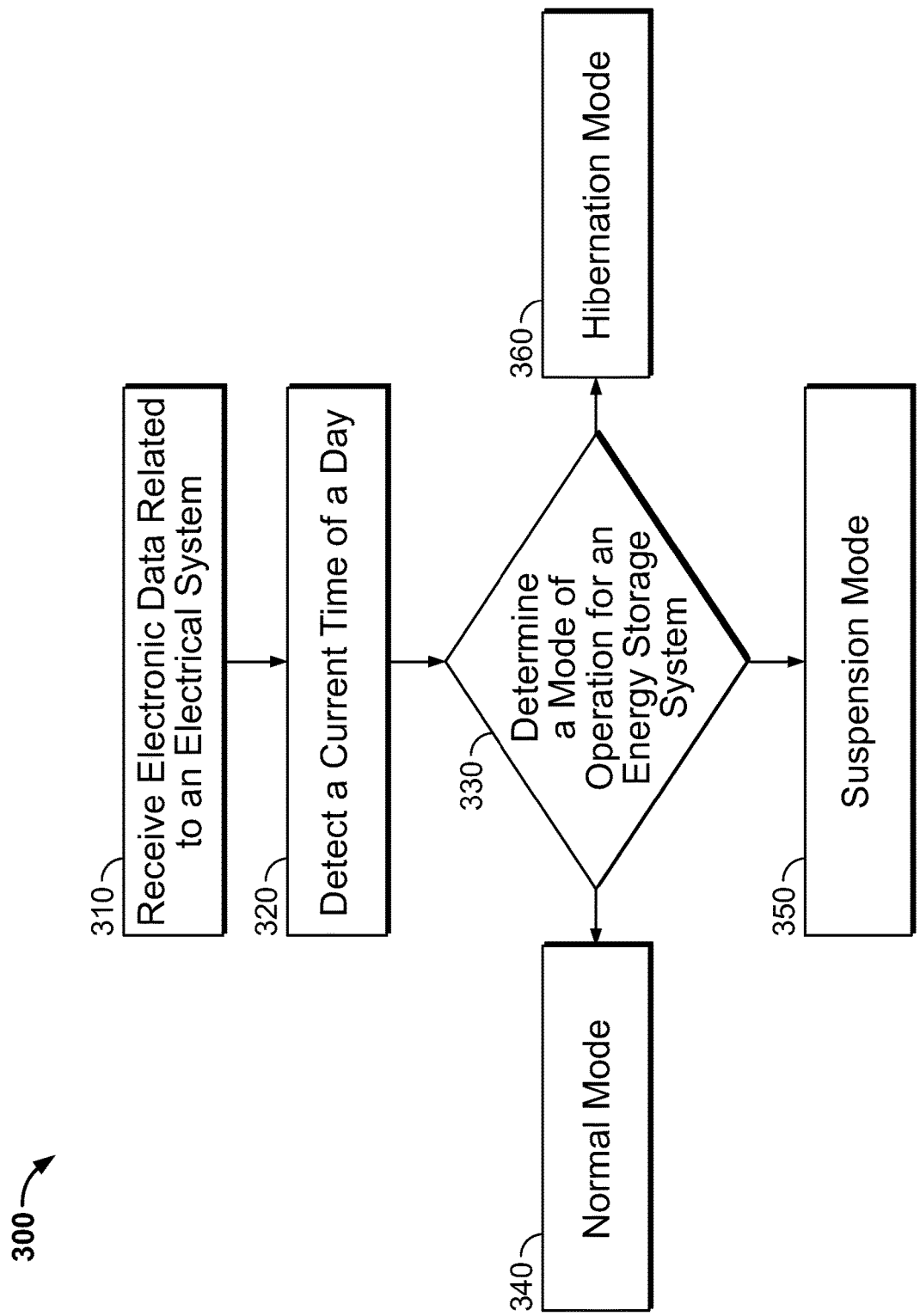
FIG. 3 illustrates a block diagram showing aspects of a method of determining a mode of an operation for an energy storage system.

FIG. 3 shows an example block diagram illustrating aspects of a method 300 of controlling electrical system 100, by a controller, such as, for example, controller 122 of microgrid interconnection device 120 and/or a controller of PV monitoring system 130. In some embodiments, method 300 can be executed by a controller located remotely with respect to energy control system 110, such as, for example, a smartphone or a computer that is in electrical communication (e.g., wired or wirelessly) with energy control system 110 over a network (e.g., WLAN, CAN, MAN, WAN, cellular, etc.) One or more aspects of method 300 may be implemented using hardware, software modules, firmware, tangible computer readable media having instructions stored thereon, or a combination thereof and may be implemented in one or more computer systems or other processing systems.

In some embodiments, method 300 can include a step of 310 of receiving electronic data related to electrical system 100. In some embodiments, the received electronic data relates to energy storage system 150, backup PV power generation system 160, the plurality of loads 170, and/or the status of utility grid 180. In some embodiments, the electronic data indicates a predicted power output of backup PV power generation system 160 and a predicted load demand by the plurality of backup loads 172. In some embodiments, the predicted power output is based on the average power output of backup PV power generation system 160 profiled over a day of time. In some embodiments, the predicted load demand is based on the average load consumption by the plurality of backup loads 172 profiled over a day of time. In some embodiments, step 310 includes accessing tables stored in memory of controller and receiving electronic data over the network with components of energy storage system 150, backup PV power generation system 160, and the plurality of loads 170.

In some embodiments, method 300 can include a step 320 of detecting a current time of the day. In some embodiments, step 320 includes using a clock to track the time of day. In some embodiments, step 320 includes using a timer and a schedule stored in the memory of the controller, such as, for example, the memory of controller 122 and/or a controller of PV monitoring system 130.

Figure 4:
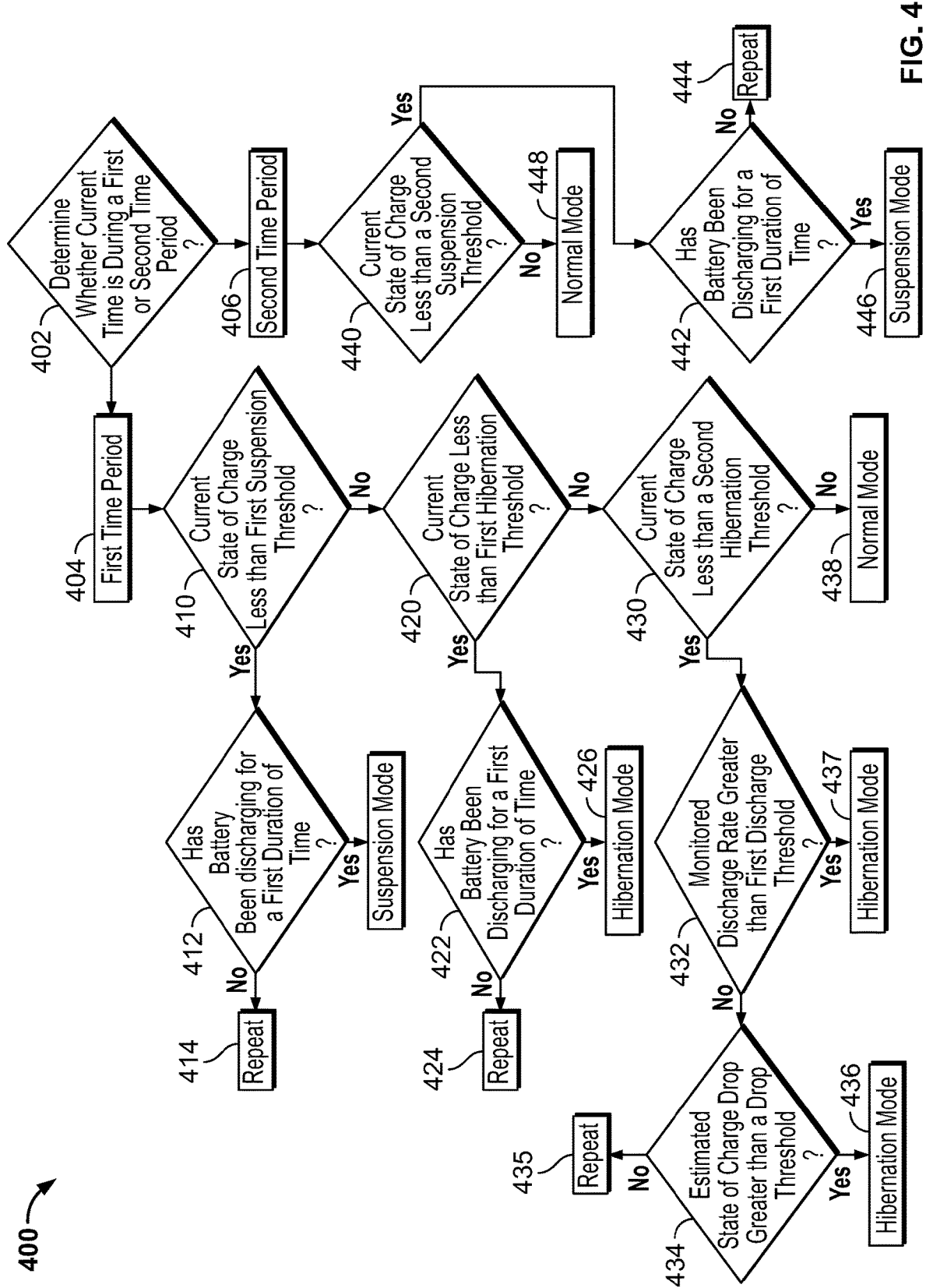
FIG. 4 illustrates a block diagram showing aspects of a method of determining a mode of an operation for an energy storage system.

In some embodiments, method 300 can include a step of 330 of determining a mode of operation for energy storage system 150, such as, normal mode, hibernation mode, and/or suspension mode. In some embodiments, step 330 can include executing an algorithm (e.g., stored as an instruction in computer readable medium) that takes into account the current state of charge of energy storage system 150 in relation to various state of charge thresholds (e.g., suspension threshold and hibernation threshold), the predicted PV power output by backup PV power generation system 160, and/or the predicted load consumption by the plurality of backup loads 172. In some embodiments, step 330 can include executing method 400, illustrated by the example block diagram shown in FIG. 4.

In some embodiments, method 300 can include a step 340 of setting the energy storage system 150 in the normal mode. In some embodiments, method 300 can include a step 350 of setting the energy storage system 150 in the suspension mode. In some embodiments, method 300 can include a step 360 of setting the energy storage system 150 in the hibernation mode.

In some embodiments, method 400 can include a step 402 of determining whether the current time is during the first time period (e.g., daytime when PV power output is greater than load demand) or the second time period (e.g., nighttime when load demand is greater than PV power output). In some embodiments, the thresholds used by controller 122 and/or a controller of PV monitoring system 130 to determine the mode of operation change based on the detected time period, so by first determining whether the current time is in the first or second time period, controller 122 and/or a controller of PV monitoring system 130 can apply the proper thresholds for determining the mode of operation. For example, when the current time is during the first time period, controller 122 and/or a controller of PV monitoring system 130 can proceed through first time period branch 404 according to some embodiments. And for example, when the current time period is during the second time period, controller 122 and/or a controller of PV monitoring system 130 can proceed through second time period branch 406 according to some embodiments.

In some embodiments, when step 402 indicates that the current time is during the first time period (e.g., daytime), method 400 includes a step 410 of determining whether the current state of charge of battery 152 is less than the first suspension threshold (e.g., 7% SoC). In some embodiments, when step 410 indicates that the current state of charge is less than the first suspension threshold during the first time period, method 400 includes a step 412 determining whether battery 152 has been discharging for the first duration of time (e.g., 5 minutes). In some embodiments, when step 410 indicates that the current state of charge is less than the first suspension threshold and step 412 indicates that battery 152 has been discharging less than the first duration of time during the first time period, method 400 includes a step 414 of repeating method 400 after waiting a predetermined amount of time, such as, for example, in a range from one minute to one hour. In some embodiments, step 414 can include waiting at least 5 minutes but less than thirty minutes before repeating method 400. In some embodiments, when step 410 indicates that the current state of charge is less than the first suspension threshold and step 412 indicates that battery 152 has been discharging more than the first duration of time during the first time period, method 400 includes a step 416 of setting energy storage system 150 in the suspension mode.

In some embodiments, when step 410 indicates that the current state of charge is not less than the first suspension threshold during the first time period (e.g., daytime), method 400 includes a step 420 of determining whether the current state of charge of battery 152 is less than the first hibernation threshold (e.g., 10% SoC). In some embodiments, when step 420 indicates that the current state of charge is less than the first hibernation threshold during the first time period, method 400 includes a step 422 determining whether battery 152 has been discharging for the duration of time (e.g., 5 minutes). In some embodiments, when step 420 indicates that the current state of charge is less than the first hibernation threshold and step 422 indicates that battery 152 has been discharging less than the first duration of time during the first time period, method 400 includes a step 424 of repeating method 400 after waiting a predetermined amount of time, such as, for example, in a range from one minute to one hour. In some embodiments, step 424 can include waiting at least 5 minutes but less than 30 minutes before repeating method 400. In some embodiments, when step 420 indicates that the current state of charge is less than the first hibernation threshold and step 422 indicates that battery 152 has been discharging more than the first duration of time during the first time period, method 400 includes a step 426 of setting energy storage system 150 in the hibernation mode.

In some embodiments, when step 420 indicates that the current state of charge is not less than the first hibernation threshold during the first time period (e.g., day time), method 400 includes a step 430 of determining whether the current state of charge of battery 152 is less than the second hibernation threshold (e.g., 15% SoC). In some embodiments, when step 430 indicates that the current state of charge is less than the second hibernation threshold during the first time period, method 400 includes a step 432 determining whether the monitored discharge rate is greater than first discharge threshold. In some embodiments, step 432 can including comparing the monitored discharge rate over the second duration of time (e.g., 1 minute). In some embodiments, when step 430 indicates that the current state of charge is less than the second hibernation threshold and step 432 indicates that the monitored discharged rate is greater than the first discharge threshold, method 400 includes a step 437 of setting energy storage system 150 in the hibernation mode.

In some embodiments, when step 430 indicates that the current state of charge is less than the second hibernation threshold and when step 432 indicates that the monitored discharged rate is less than the first discharge threshold, method 400 includes a step 434 of comparing the estimated state of charge drop over the third duration of time to the drop threshold. In some embodiments, step 434 can include calculating the estimated state of charge drop by taking the sum of (a) the energy already discharged from battery 152 between the current time and the last activation attempt and (b) the predicted amount of power discharged from battery 152 between the current time and the next activation attempt (e.g., the third duration of time), and then, dividing the sum of discharged power over the energy rating (e.g., total energy capacity in kWh) of battery 152 (e.g., Estimated SoC Drop=[Energy Already Discharged+Predicted Energy Discharged]/Energy Rating of Battery). In some embodiments, the drop threshold used in step 434 can range between approximately 0.5% and approximately 1.5% of the energy rating of battery 152, such as, for example, 1.0% of the energy rating of battery 152. In some embodiments, step 434 can include determining the third duration of time by taking the difference of time between the current time and the time of the next activation attempt. In some embodiments, the third duration of time used for step 434 can be set in a range from approximately 5 minutes to approximately 5 hours, such as for example, 1 hour to 3 hours.

In some embodiments, step 434 can include calculating the predicted power discharged by taking a product of (a) an estimated power (kW) discharged by battery 152 and (b) the third duration of time (e.g., predicted energy discharged=estimated power discharged by battery*third duration of time). In some embodiments, step 434 can include calculating the estimated power discharged by battery 152 by dividing the energy (KWh) discharged by battery 152 over the first duration of time. In some embodiments, the first duration of time used in step 434 can be in a range between approximately 3 minutes and approximately 7 minutes, such as, for example, 5 minutes.

In some embodiments, when step 434 indicates that the estimated state of charge drop is less than the drop threshold, method 400 includes a step 435 of repeating method 400 after waiting a predetermined amount of time, such as, for example, in a range from one minute to one hour. In some embodiments, step 435 can include waiting at least 5 minutes but less than 30 minutes before repeating method 400. In some embodiments, when step 434 indicates that the estimated state of charge drop is greater than the drop threshold, method 400 includes a step 436 of setting energy storage system 150 in the hibernation mode.

In some embodiments, when step 430 indicates that the current state of charge is greater than the second hibernation threshold during the first time period (e.g., daytime), method 400 includes a step 438 of setting the energy storage system in the normal mode.

In some embodiments, when step 402 indicates that the current time is during the second time period (e.g., nighttime), method 400 includes a step 440 of determining whether the current state of charge of battery 152 is less than the second suspension threshold (e.g., 15% SoC). In some embodiments, when step 440 indicates that the current state of charge is less than the second suspension threshold during the second time period, method 400 includes a step 442 determining whether battery 152 has been discharging for the first duration of time (e.g., 5 minutes). In some embodiments, when step 440 indicates that the current state of charge is less than the second suspension threshold and step 442 indicates that battery 152 has been discharging less than the first duration of time during the second time period, method 400 includes a step 444 of repeating method 400 after waiting a predetermined amount of time. In some embodiments, when step 440 indicates that the current state of charge is less than the second suspension threshold and step 442 indicates that battery 152 has been discharging more than the first duration of time during the second time period, method 400 includes a step 446 of setting energy storage system 150 in the suspension mode.

In some embodiments, when step 440 indicates that the current state of charge is greater than the second suspension threshold during the second time period (e.g., nighttime), method 400 includes a step 448 of setting the energy storage system in the normal mode.

It is to be appreciated that the Detailed Description section, and not the Summary and Abstract sections, is intended to be used to interpret the claims. The Summary and Abstract sections may set forth one or more but not all exemplary embodiments of the present embodiments as contemplated by the inventor(s), and thus, are not intended to limit the present embodiments and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. An electrical system, comprising:
   an energy control system electrically coupled to a plurality of backup loads;
   a photovoltaic (PV) power generation system electrically coupled to the energy control system, the PV power generation system configured to generate power; and
   an energy storage system electrically coupled to the energy control system, the energy storage system comprising:
      a battery configured to store the power generated by the power generation system and configured to discharge stored power to the energy control system, and
      a storage converter electrically coupled to the battery and electrically coupled to the energy control system,
   wherein the energy storage system is configured to operate according to a selected mode of operation of a plurality of modes of operation, wherein the plurality of modes of operation include:
      a normal mode, wherein the battery and the storage converter are activated to discharge stored power to the energy control system,
      a hibernation mode, wherein the storage converter is deactivated to prevent the discharge of stored power from the energy storage system to the energy control system, and
      a suspension mode, wherein the battery and the storage converter are deactivated, and
   wherein the energy control system is configured to select one of the normal mode, the hibernation mode, or the suspension mode as the selected mode of operation based on whether an estimated state of charge drop by the energy storage system over a duration of time is greater than a drop threshold over the duration of time.

2. The electrical system of claim 1, wherein the energy control system comprises a controller configured to:
   detect a current time of a day and receive electronic data from the electrical system, and determine the selected mode of operation for the energy storage system based on the current time of the day and the electronic data.

3. The electrical system of claim 2, wherein the controller is configured to repeat selecting the mode of operation for the energy storage system according to a schedule of activation attempts stored in the controller.

4. The electrical system of claim 2, wherein the electronic data indicates a predicted power output of the power generation system and a predicted load demand by the plurality of backup loads.

5. The electrical system of claim 4, wherein the predicted power output is based on the average power output of the power generation system profiled over a day of time.

6. The electrical system of claim 5, wherein the predicted load demand is based on the average load consumption by the plurality of backup loads profiled over a day of time.

7. The electrical system of claim 2, wherein the electronic data indicates a current state of charge of the battery and a monitored discharge rate of the battery.

8. The electrical system of claim 7, wherein the controller is configured to set the mode operation to the suspension mode when:
   the current time is during a first time period, the current state of charge of the battery is less than a first suspension threshold, and the battery has been discharging for a first duration of time, or
   the current time is during a second time period, the current state of charge of the battery is less than a second suspension threshold, and the battery has been discharging for the first duration of time.

9. The electrical system of claim 8, wherein the first suspension threshold is in a range from approximately 5% to approximately 9% of a rated capacity of the battery, the second suspension threshold is in a range from approximately 13% to approximately 17% of a rated capacity of the battery, and the first duration of time is in a range from approximately 3 minutes to approximately 7 minutes.

10. The electrical system of claim 8, wherein the first time period is when a predicted power output of the power generation system is greater than a predicted load demand by the plurality of backup loads, and the second time period is when the predicted power output of the power generation system is less than the predicted load demand by the plurality of backup loads.

11. The electrical system of claim 10, wherein the predicted power output is based on an average power output of the power generation system profiled over a day of time, and the predicted load demand is based on the average load consumption by the plurality of backup loads profiled over a day of time.

12. The electrical system of claim 7, wherein the controller is configured to set the mode of operation to the hibernation mode when:
   the current state of charge of the battery is less than a first hibernation threshold, and the battery has been discharging for a first duration of time;
   the current state of charge of the battery is less than a second hibernation threshold, and the monitored discharge rate is greater than a discharge threshold for a second duration of time; or
   the current state of charge of the battery is greater than the first hibernation threshold and less than the second hibernation threshold, and an estimated state of charge drop of the battery is greater than a drop threshold over a third duration of time.

13. The electrical system of claim 12, wherein the first hibernation threshold is in a range from approximately 8% to approximately 12% of a rated capacity of the battery, the second hibernation threshold is in a range from approximately 13% to approximately 17% of a rated capacity of the battery, and the discharge threshold is in the range from approximately 50% to approximately 100% of a maximum current discharged by the battery.

14. The electrical system of claim 12, wherein the first time duration is in a range from 3 minutes to 7 minutes, the second time duration is in a range from approximately 30 seconds to approximately 90 seconds, and the third duration of time is in a range from approximately 1 hour to approximately 3 hours.

15. A method for controlling an electrical system having a PV power generation system, an energy storage system, and an energy control system, the energy control system electrically coupled to the power generation system, the energy storage system, and a plurality of loads, the method comprising:
   receiving electronic data from the electrical system;
   detecting a current time of day;
   determining, at a first attempt time, a mode of operation of a plurality of modes of operation for the energy storage system based on the current time of day and the electronic data, wherein the plurality of modes of operation include:
     a normal mode, wherein a battery and a storage converter of the energy storage system are activated to discharge power to the energy control system,
     a hibernation mode, wherein the storage converter of the energy storage system is deactivated to prevent discharge of power from the energy storage system to the energy control system, and
     a suspension mode, wherein the battery and the storage converter of the energy storage system are deactivated; and
   causing the energy storage system to enter the mode of operation based on whether an estimated state of charge drop by the energy storage system over a duration of time is greater than a drop threshold over the duration of time.

16. The method of claim 15, further comprising:
   determining, at a second attempt time, the mode of operation for the energy storage system after waiting a predetermined amount of time after the first attempt time,
   wherein the predetermined amount of time is based on a predetermined schedule of activation attempts.

17. The method of claim 15, wherein the electronic data indicates a predicted power output by the PV power generation system profiled over a day of time, a predicted load demand by the plurality of loads profiled over a day of time, a current state of charge of the battery, a monitored discharge rate of the battery, or a combination thereof.

18. The method of claim 17, wherein determining the mode of operation comprises determining whether the current time of day is within:
   a first time period defined when the predicted power output is greater than the predicted load demand, or
   a second time period defined when the predicted power output is less than the predicted load demand.

19. The method of claim 18, wherein determining the mode of operation comprises selecting the suspension mode when:
   the current time is during the first time period, the current state of charge of the battery is less than a first suspension threshold, and the battery has been discharging for a first duration of time, or the current time is during the second time period, the current state of charge of the battery is less than a second suspension threshold, and the battery has been discharging for the first duration of time.

20. The method of claim 18, wherein determining the mode of operation comprises selecting the hibernation mode when the current time of day is during the first time period and when:

the current state of charge of the battery is less than a first hibernation threshold, and the battery has been discharging for a first duration of time, the current state of charge of the battery is less than a second hibernation threshold, and the measured discharge rate is greater than a discharge threshold for a second duration of time, or the current state of charge of the battery is greater than the first hibernation threshold and less than the second hibernation threshold, and an estimated state of charge drop of the battery is greater than a drop threshold over a third duration of time.

* * * * *